US006295823B1

(12) United States Patent
Odom et al.

(10) Patent No.: US 6,295,823 B1
(45) Date of Patent: Oct. 2, 2001

(54) APPARATUS AND METHOD FOR CONTROLLING TEMPERATURE AND HUMIDITY OF A CONDITIONED SPACE

(75) Inventors: Julius David Odom, Orlando; David MacPhaul, Gainesville, both of FL (US); Michael R. Harris, Alpharetta, GA (US)

(73) Assignee: CH2M Hill, Inc., Denver, CO (US)

( * ) Notice: Subject to any disclaimer, the term of this patent is extended or adjusted under 35 U.S.C. 154(b) by 0 days.

(21) Appl. No.: 09/520,594

(22) Filed: Mar. 8, 2000

Related U.S. Application Data

(63) Continuation-in-part of application No. 09/282,657, filed on Mar. 31, 1999, now abandoned.
(60) Provisional application No. 60/124,549, filed on Mar. 16, 1999, and provisional application No. 60/151,990, filed on Sep. 1, 1999.
(51) Int. Cl.[7] .................................. B01F 3/02; G05D 21/00
(52) U.S. Cl. ...................... 62/176.6; 62/180; 165/249; 165/139; 236/44 C; 236/1 R; 454/256
(58) Field of Search .......................... 236/44 C, 44 A, 236/1 R; 62/176.6, 180; 165/249, 225, 135; 454/256, 236

(56) References Cited

U.S. PATENT DOCUMENTS

| Re. 20,069 | 8/1936 | Karr et al. . | |
|---|---|---|---|
| 2,021,090 | 11/1935 | Ringquist . | |
| 2,155,484 | 4/1939 | Gottlieb . | |
| 2,285,042 | 6/1942 | MacDonald, Jr. . | |
| 2,321,242 | 6/1943 | Ramsey . | |
| 2,438,120 | 3/1948 | Freygang . | |
| 3,015,216 | 1/1962 | Coblentz | 62/180 |
| 3,406,528 | 10/1968 | Dijt | 62/89 |
| 3,938,348 | 2/1976 | Rickert | 62/97 |
| 4,876,858 | * 10/1989 | Shaw et al. | 62/93 |
| 4,942,740 | * 7/1990 | Shaw et al. | 62/93 |
| 5,752,389 | * 5/1998 | Harper | 62/176.5 |

OTHER PUBLICATIONS

Disney's All Star Resorts Mock–Up guestroom Environmental Test Report, Jan. 1992.

* cited by examiner

Primary Examiner—William Wayner
(74) Attorney, Agent, or Firm—Swanson & Bratschun, L.L.C.

(57) ABSTRACT

An apparatus for controlling temperature and humidity of a conditioned space uses an outside air cooling coil circuit in fluid communication with coolant from a cooling supply. Outside air is introduced over the outside air cooling coil circuit through a damper having open and closed positions. A valve in fluid communication with the coolant supply and the outside air cooling coil circuit has an open setting for permitting and a closed setting for preventing the circulation of coolant through the outside air cooling coil circuit. An HVAC unit control is operatively associated with the valve and the damper for controlling their operation. An occupancy control generates a signal indicating the presence of a human within the conditioned space and is operatively associated with the HVAC unit control. The HVAC unit control, in response to a signal from the occupancy control indicating the presence of a human within the conditioned space, causes the damper to be open and enables the valve to be switched between the closed and open settings. A method of conditioning the air within a conditioned space provides an outside air cooling coil circuit. The presence or absence of a human within the conditioned space is continuously monitored. When a human is present, outside air is continuously directed onto the outside air cooling coil circuit and into the conditioned space. The need to decrease the humidity of the outside air directed onto the air cooling coil circuit is continuously monitored so as to enable the humidity within the conditioned space to be maintained below a select humidity threshold. Coolant is circulated through the outside air cooling coil circuit when a human is present within the conditioned space and the humidity within the conditioned space is determined to be above the select humidity threshold.

16 Claims, 3 Drawing Sheets

APPARATUS AND METHOD FOR CONTROLLING TEMPERATURE AND HUMIDITY OF A CONDITIONED SPACE

RELATED APPLICATIONS

This application claims priority from U.S. Provisional Patent Application Ser. No. 60/124,549, filed Mar. 16, 1999, entitled "Hybrid Fan Coil Unit," and U.S. Provisional Patent Application Ser. No. 60/151,990, filed Sep. 1, 1999, entitled "Hybrid Unit Ventilator." This application is also a continuation-in- part of U.S. patent application Ser. No. 09/282,657, filed Mar. 31, 1999, entitled "Apparatus and Method for Controlling Temperature and Humidity of a Conditioned Space."

TECHNICAL FIELD

The present invention is directed to heating, ventilation and air conditioning (HVAC) units, and more particularly to an HVAC unit having a single fan coil with a first circuit for dehumidifying outside air introduced into a conditioned space and a sensor for detecting the need to introduce outside air into the conditioned space and the need to dehumidify the same.

BACKGROUND ART

Many multi-tenant office and residential buildings seek to provide heating and cooling which can be adjusted by the occupants of each conditioned space. In many instances this is provided by thermostat controlled central heating and air conditioning. However, in many applications, particularly in hotels or apartments, it is highly desirable to provide individual HVAC units for each conditioned space of the building. This is typically the case with hotels where individual preferences for temperature may vary greatly and efficient management of the hotel includes being able to greatly curtail heating or air conditioning to particular rooms or conditioned spaces when they are not being used.

Building code regulations typically require introduction of specified amounts of outside or ambient air into occupied interior spaces. While many standard room HVAC units are capable of introducing outside ambient air into a conditioned space, they are not capable of providing continuous dehumidification of the outside air supply to the conditioned space as conditions may require. Typically, dehumidification only occurs during room cooling when coolant is supplied to a cooling coil within the HVAC unit and the cooling coil is then at a temperature below the dew point of the outside or ambient air, thereby condensing excess humidity from the outside air. When the HVAC unit is not providing cooling to the conditioned space, outside air, which may be at high relative humidity, is directly introduced into the conditioned space. This leads to elevated levels of relative humidity within the conditioned space, which promotes microbial growth on interior surfaces within the space. As should be readily apparent, the less the space is cooled, the higher the relative humidity within the space rises and the more microbial growth is promoted. Thus, especially in hot, humid regions, cooling of outside air for dehumidification purposes is highly desirable. The alternative of continuously cooling all the air circulated through the HVAC unit can frequently cause over cooling of the conditioned space and is certainly not energy efficient as it requires cooling of the conditioned space during all times, even when the conditioned space is not in use.

Minimizing the consumption of energy while providing adequate ventilation and controlling the temperature and humidity within a conditioned space can lead to significant cost savings over the operational life of a building. Energy consumption can be minimized by only dehumidifying outside air when its ambient humidity requires dehumidification to control humidity within the conditioned space and by only introducing outside air within the conditioned space when it is occupied by a human.

One known solution to the above described problems is to provide a separate centralized ventilation system that includes dehumidification of outside air provided to each conditioned space. However, such a solution requires including air distribution duct work along with a centralized dehumidification system and controls, resulting in much greater initial construction costs. Moreover, it is cost prohibitive to retrofit existing buildings with such a separate, centralized, ventilation system. Furthermore, it circulates outside air to individual conditioned spaces whether or not they are occupied.

Another known solution to the problem of conditioning outside air to lower its humidity is an HVAC unit that continuously introduces outside or ambient air to the conditioned space with the ambient air being run over an outside air cooling coil circuit to dehumidify the outside air. A return air cooling coil circuit is provided for the cooling of return air from the conditioned space to provide cooling of the conditioned space on demand. Such a system, however, does not allow for introduction of outside air without cooling it whether or not dehumidification is necessary and further supplies outside air whether or not occupancy of the conditioned space dictates the need.

Yet another potential solution to the dehumidification of outside air, described in Rickert, U.S. Pat. No. 3,938,348, involves maintaining an evaporation coil at a select temperature below the dew point temperature of the outside air at all times the HVAC unit is in operation. When cooling is desired, return air from the conditioned space is run over the same coils concurrently with the outside air being dehumidified and the combined airflow is introduced to the conditioned space. However, this solution requires providing coolant to the entire coil during simple dehumidification and dehumidification in combination with cooling of the room, which is not energy efficient.

The present invention is directed toward overcoming one or more of the problems discussed above.

SUMMARY OF THE INVENTION

A first aspect of the invention is a heating, ventilation and air conditioning (HVAC) unit for a conditioned space. The HVAC unit includes a cooling coil divided into a first cooling coil circuit and a second cooling coil circuit, each in fluid communication with coolant from a coolant supply. Each of the first and second cooling coil circuits has a leading and a trailing surface. The leading surfaces are defined by first and second perpendicular axes with the coil being divided along the first axis into the first and second circuits. An outside air intake introduces air from outside to inside the conditioned space, with the outside air intake being positioned to distribute outside air to substantially the center of the leading surface of the first cooling coil circuit along the second axis. A return air intake introduces return air from inside the conditioned space to the leading surface of the second cooling coil circuit. A first fluid valve is provided in fluid communication with the coolant supply and the first cooling coil circuit and has an open setting permitting and a closed setting preventing the circulation of coolant through the first cooling coil circuit. A humidity control is coupled to the first valve for actuating the first valve between the open and closed settings as a function of a need to decrease the humidity of outside air introduced into the conditioned space. An exhaust introduces the outside air and the return air from the trailing surface of the first and second cooling coil circuits to the conditioned space.

A second valve is preferably provided in fluid communication with the coolant supply and the second cooling coil circuit with the second valve selectively permitting and preventing the circulation of coolant through the second cooling coil circuit. A temperature control is coupled to the second valve for actuating the second valve between the open and closed settings as a function of a need to decrease the temperature of the conditioned space. A fan is preferably provided in fluid communication with the exhaust for drawing outside air into the outside air intake and return air into the return air intake and a heater is preferably provided in fluid communication with the exhaust for heating outside and return air before introduction to the conditioned space. An occupancy sensor may be provided within the conditioned space for sensing the presence or absence of a human within the conditioned space. The occupancy sensor is coupled to a damper and when it senses the presence of a human within the conditioned space, it opens the damper to allow outside air to enter the conditioned space. When the occupancy sensor senses the absence of a human within the conditioned space, the damper is closed, preventing the entry of outside air.

A second aspect of the present invention is a method of conditioning the air within a conditioned space. An outside air cooling coil circuit and a return air cooling coil circuit are provided. The conditioned space is monitored for the presence or absence of a human. When a human is present, outside air is continuously directed onto the outside air cooling coil circuit and into the conditioned space. The need to decrease the humidity of the outside air directed onto the outside air cooling coil circuit is continuously monitored to maintain the humidity within the conditioned space below a select humidity threshold. Coolant is circulated through the outside air cooling coil circuit when a human is present in the conditioned space and the humidity within the conditioned space is determined to be above the select humidity threshold. The method may further include continuously directing air from inside the conditioned space over the return air cooling coil circuit and back into the conditioned space. The method may further include mixing the outside air from over the outside air cooling coil circuit and return air from over the return air cooling coil circuit and then introducing the mixed air into the conditioned space. The temperature within the conditioned space may be continuously monitored and coolant circulated through the return air cooling coil circuit only when the temperature inside the conditioned space exceeds a select temperature. The monitoring may be performed by an occupancy sensor within the conditioned space. The occupancy sensor is preferably coupled to a damper in fluid communication with outside air for regulating outside air entry into the conditioned space and a valve for circulating coolant through the outside air cooling coil circuit.

Yet another aspect of the present invention is an HVAC unit for a conditioned space including an outside air cooling coil circuit having a leading and a trailing surface in fluid communication with coolant from a coolant supply. An outside air intake introduces air over the leading surface of the outside air cooling coil circuit and into the conditioned space. A damper in fluid communication with the outside air intake has an open position permitting and a closed position preventing outside air from entering the intake. A valve in fluid communication with the coolant supply and the outside air cooling coil circuit has an open setting permitting and a closed setting preventing the circulation of coolant through the outside air cooling coil circuit. An exhaust introduces the outside air from the trailing surface of the outside air cooling coil circuit into the conditioned space. An HVAC unit control is operatively associated with the valve and the fan for controlling their operation. An occupancy control generates a signal indicating the presence of a human within the conditioned space and is operatively associated with the HVAC unit control. The HVAC unit control, in response to a signal from the occupancy control indicating the presence of a human within the conditioned space causes the damper to be open and enables the valve to be switched between the closed and open settings. A humidity control may be coupled to the HVAC unit control for generating a signal indicating the need to decrease humidity within the conditioned space. The HVAC unit control, in response to such a signal, actuates the valve to the open setting. When the occupancy control does not generate a signal indicating the presence of a human within the conditioned space, the HVAC unit closes the damper and actuates the valve to the closed setting.

The apparatus and method for controlling humidity of a conditioned space in accordance with the present invention provides a single cooling coil divided into an outside air dehumidifying circuit and a return air cooling circuit. By directing outside air to the center of the dehumidifying circuit, the dehumidifying circuit is employed as efficiently as possible. By monitoring whether a human is present within the conditioned space, the unit and method allows the unit to circulate outside air into the conditioned space only when required by the presence of a human within the space. Thus, significant energy savings can be realized by conditioning the air within the conditioned space only when required. Moreover, the system continuously monitors the need to dehumidify the outside air introduced into the room. In this manner, coolant need only flow through the outside air cooling coil circuit when dehumidification is required, thereby further improving the efficiency of the unit and method.

Not only does the unit and method for controlling temperature and humidity of a conditioned space minimize energy consumption and operating costs, it does so using a unique combination of elements which are readily available as off the shelf products. Furthermore, the unit and method allow for expedient retrofitting of conditioned spaces with existing HVAC units so as to provide the many advantages of the invention to existing structures at a minimal cost.

DETAILED DESCRIPTION OF THE PREFERRED EMBODIMENT

Figure 1:
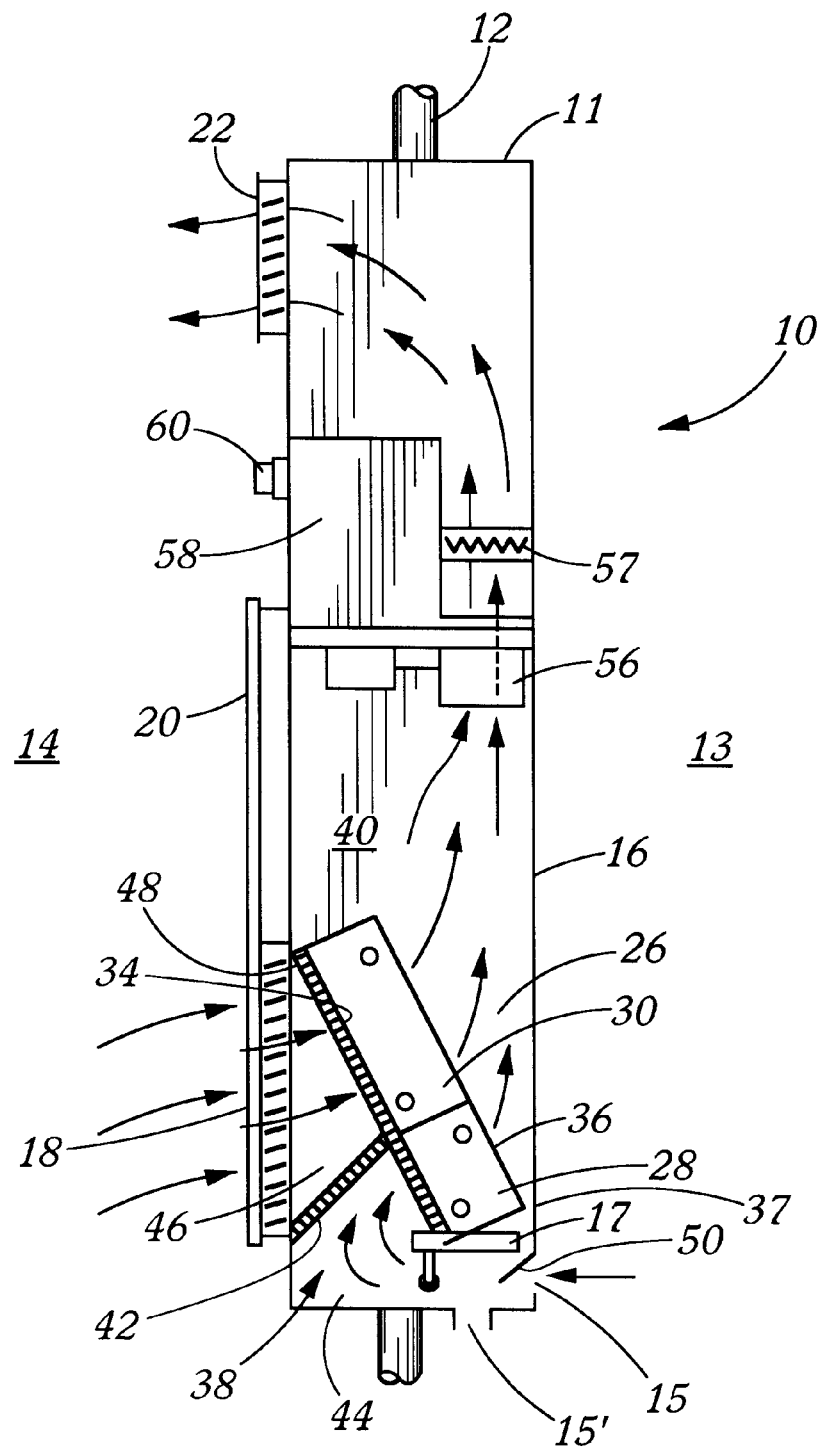
FIG. 1 is a schematic side view of the HVAC unit for controlling temperature and humidity of a conditioned space in accordance with the present invention.

An HVAC unit 10 for controlling temperature and humidity of a conditioned space of the present invention is illustrated schematically in the side view of FIG. 1. The HVAC unit 10 consists of a housing 11 which contains the components of the unit. The housing 11 is intended to be installed in an exterior wall or partition 12 which divides the outside 13 from the conditioned space 14. The housing 11 includes an outside air intake 15 located proximate the bottom and substantially in the center of the back 16 of the housing 11 (see FIG. 4). A damper 17 having an open position permitting a closed position preventing outside air to flow through the outside air intake is shown in its open position. The damper includes an actuator to actuate it between its open and closed positions. The housing 11 further includes a return air intake 18 proximate the bottom of the front 20 of the housing 11. Also in the front 20 of the housing 11, proximate the top of the housing, is a mixed air exhaust 22.

Contained within the housing 11 is a single cooling coil 26 having an outside air cooling circuit 28 and a return air cooling circuit 30. As best viewed in FIG. 2, the single cooling coil consists of a first fluid circuit defining the outside air cooling circuit 28 having a tube 29 and a second fluid circuit defining the return air cooling circuit 30 having a tube 31, with the tubes joined by a plurality of common fins 32. The cooling coil 26 has a substantially planar leading surface 34 and trailing surface 36. The planar leading surface 34 is defined by an X and Y axis (see FIG. 2). The cooling coil 26 is vertically inclined within the housing 11 with the bottom of the outside air cooling circuit 28 in close proximity with the bottom and back 16 of the housing 11 and the top of the return air cooling circuit 30 attached near the middle of the front 20 of the housing 11. A partition 37 is used to connect the bottom of the air cooling circuit 28 to the back 16 of the housing. If needed, a similar partition can connect the top of the return air circuit to the front 20 of the housing 11. In addition, although not shown, the coil 26 extends between the side walls of the housing interior or partitions connect it to side walls of the interior. In this manner, the interior of the housing is divided into an introduction chamber 38 and a mixing chamber 40 by the coil 26. An insulated baffle 42 further divides the introduction chamber into an outside air plenum 44 and a return air plenum 46. A single planar filter 48 abuts the planar front 34 of the coil 26. A drain pan 50 underlies the bottom of the outside air cooling circuit 28 of the coil 26 to collect condensation from the coil. A drain 52 including a trap 54 removes condensation from the drain pan and the housing.

A fan 56, is located in fluid communication with the mixing chamber. Downstream from the fan is a heating coil 57 which is preferably an electric heating coil, although a hot water heating coil could be used as well. Further downstream from the heating coil 57 is the mixed air exhaust 22 for returning mixed air to the conditioned space 14. A unit control 58 at the front 20 of the housing 11 includes a number of inputs 60 for a guest to control fan speed and the temperature of mixed air exhausted from the unit 10.

Figure 2:
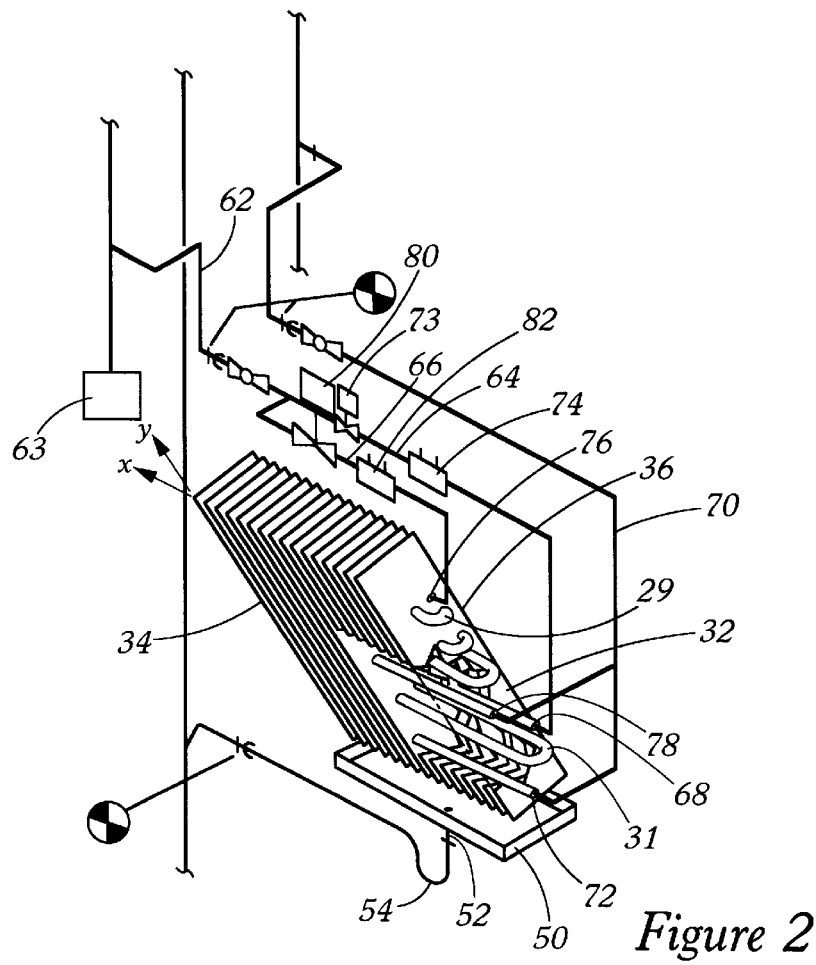
FIG. 2 is a schematic representation of the coil and coolant circulation system of the present invention.

FIG. 2 schematically illustrates the coolant circuit delivering coolant to the tubes 21, 31 of the cooling coil 26. A conduit 62 extends from a coolant supply 63 and is divided into an outside coolant supply conduit 64 and a return coolant supply conduit 66. The outside coolant supply conduit 64 is coupled to a coolant inlet 68 in the outside air cooling circuit 28 of the coil 26. A recirculation conduit 70 returns the coolant from coolant outlet 72 to the coolant supply. A solenoid operated temperature control valve 73 selectively allows and prevents coolant from flowing through the outside air cooling circuit 28 of the coil 26. An automatic flow control valve 74 is provided in fluid communication with the outside coolant supply conduit 64 to regulate the flow of coolant through the outside air cooling circuit 28 of the coil 26.

The return coolant supply conduit 66 is likewise connected to a coolant inlet 76 in the return air cooling circuit 30 of the cooling coil 26. The recirculation conduit 70 in turn is in fluid communication with the coolant outlet 78 of the return air cooling circuit 30. A solenoid operated temperature control valve 80 selectively allows and prevents coolant from flowing through the return air cooling circuit 30 of the coil 26. When coolant is flowing through the return air cooling circuit 30, an automatic flow control valve 82 maintains the flow through the return air cooling circuit 30 at a select constant flow.

Although the preferred embodiment contemplates use of a coolant such as chilled water, those skilled in the art would recognize that cooling could be provided by expansion of a suitable refrigerant within the coil 26.

Figure 3:
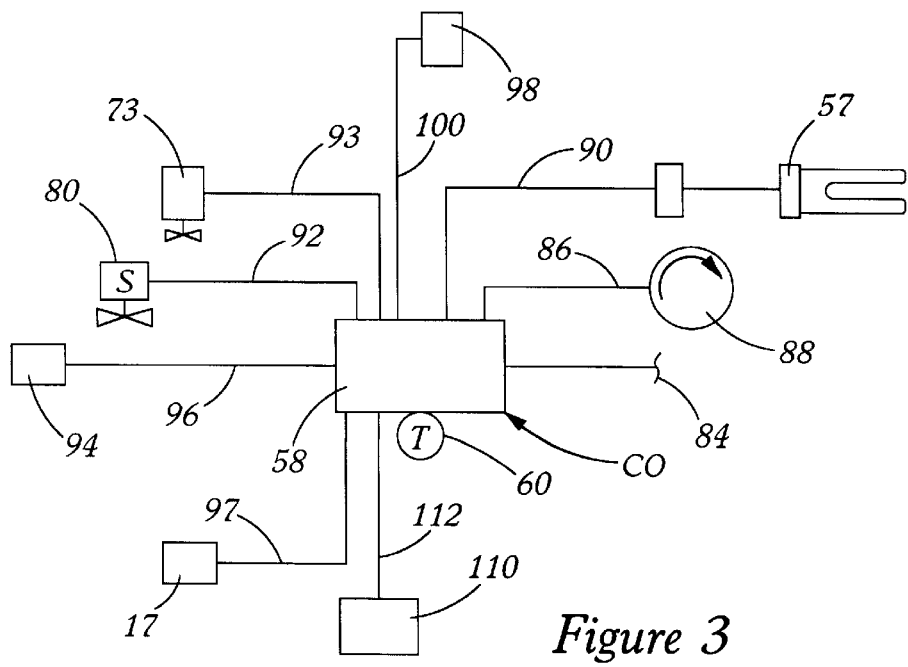
FIG. 3 is a schematic view of the electric control of the present invention.

FIG. 3 schematically illustrates the electronic control of the HVAC unit 10. A power supply 84 is coupled to the unit control 58 which includes the inputs 60. A connector 86 couples the control unit to a motor 88 of the fan 56. A connector 90 couples the unit control 58 to electric heating coil 57. Connector 92 connects the unit control 58 to the solenoid operated temperature control valve 80. Connector 93 connects the unit control 58 to the solenoid operated control valve 73. A thermostat 94 is preferably remotely located from the control panel and electrically connected by the connector 96. Alternatively, the thermostat can be located on the control panel. Damper 17 is coupled to the unit controller by connector 97. A thermostat 98 is connected by connector 100 to the controller. The thermostat monitors outdoor temperatures and determines whether the outdoor temperature is below that at which indoor humidity problems can be caused by the continuous introduction of outside air. Typically, when the outdoor temperature is below 6020 F. there are no indoor humidity problems. Alternatively a dew point sensor can be substituted for the thermostat 98. Typically when the dew point is below 6020 F. indoor humidity is not sufficiently high to create problems. Yet another alternative is to substitute a humidistat for the thermostat 98 with the humidistat deployed within the conditioned space to monitor the indoor humidity. The humidistat determines whether the indoor humidity is below a select point.

An occupancy control 110 is connected by connector 112 to the unit control 58. The occupancy control may consist of a switch located on a master panel that allows an operator to actuate the damper 17 to its open position and the solenoid operated temperature control valve 73 to supply outside air to the conditioned space and coolant to the outside air cooling circuit 28 as required when the conditioned space is to be occupied. Alternatively, the occupancy control 110 within the conditioned space detects the presence of a human in the occupied space to actuate the damper 17 and coolant as described above.

In operation, the occupancy control dictates whether outside air is to be circulated to the conditioned space. Where the occupancy control is a switch on a master panel, an operator will switch the HVAC "on" when the conditioned space is to be occupied. Alternatively, where the occupancy control is an occupancy sensor, when the presence of a human is detected in the conditioned space, an appropriate signal is sent to the unit control. In either circumstance this causes the damper 17 to be opened and outside air to be drawn through the outside air intake 15, into the outside air plenum 44 and over the outside air cooling circuit 28 of the coil 26. The temperature control valve 73 is also enabled. As required for dehumidification, coolant is circulated through the outside air cooling circuit 28 of the coil 26 through coolant supplied from the coolant supply via the outside coolant supply circuit 64 and removed through the recirculation conduit 70.

The coolant circulated through the outside air cooling circuit 28 is maintained below the dew point of the outside air so as to condense excess humidity onto the tubes and fins of the outside air cooling circuit 28 of the coil 26. As condensation builds up, it drips from the coil or runs down the fins 32 and collects in the drain pan 50. Excess condensation then drains from the drain pan through the drain 52 and trap 54 for disposal. Condensate may also be collected from the return air circuit of the coil 26 during cooling of the conditioned space. Because of the use of a single coil and the vertical inclination of the coil, this condensate will flow down fins 32 of the coil and into the drain pan 50, thereby necessitating only a single drain pan 50.

The now dehumidified outside air enters the mixing chamber 40 and is mixed with return air which is drawn from the conditioned space through the return air intake 18 and has passed over the return air cooling circuit 30 of the coil 26. The mixed air is then drawn through the fan 56, passed over the heating coil 57 and outputed into the conditioned space through the mixed air exhaust 22. The thermostat 98 monitors the need to dehumidify the outside air. If the outside temperature drops below a select point, typically 60° F. the valve 73 is actuated to halt the flow of coolant through the outside air cooling circuit 28. Alternatively, a dew point sensor is used in place of the thermostat 98 and when the dew point drops below a select point, typically 60° F. the valve 73 is actuated to halt the flow of coolant. If a room humidistat is substituted for the thermostat 98, the valve 73 is actuated to halt the flow of coolant through the outside air cooling circuit when the humidity within the conditioned space is sufficiently low. Obviously, as the temperature, dew point or indoor humidity rise above the select point, the valve is opened so as to enable cooling and thus dehumidification of the outside air. When cooling is not required, coolant does not circulate through the return air cooling circuit 30 of the coil 26. That is, solenoid operated temperature control valve 80 is biased in the closed position.

When cooling of the conditioned space is desired, the solenoid operated temperature control valve 80 is actuated to an open position to allow coolant to circulate through the return air cooling circuit 30 of the coil 26. Then, as return air is drawn over the return air cooling circuit of the coil, the return air is cooled before entering the mixing chamber 40. When cooling is not required or when heating is required, coolant does not flow through the return air cooling circuit 30 and the mixed air either exhausts without further treatment into the conditioned space 14 through the mixed air exhaust 22 or, if desired, prior to passing through the mixed air exhaust the air is heated by the electric heating coil 32.

When the occupancy control indicates the conditioned space is not occupied, the damper 17 is actuated to its closed position and the valve 73 is actuated to halt the flow of coolant through the outside air cooling coil circuit 28. This feature reduces energy consumption by not circulating the coolant when the room is unoccupied and circulation of outside air is not required.

Figure 4:
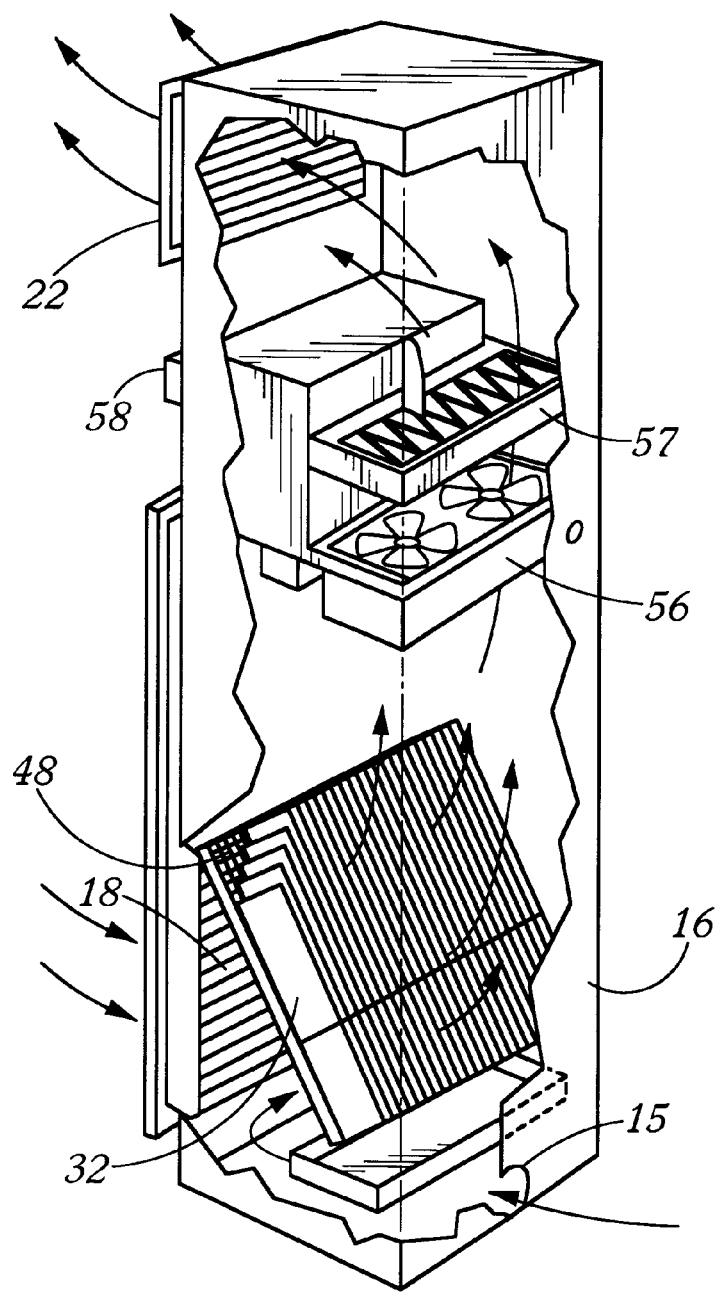
FIG. 4 is a perspective schematic view of the HVAC unit in accordance with the present invention illustrating the circulation of outside air and return air through the unit.

As illustrated in FIG. 4, the outside air intake 15 directs air over the center of the outside air cooling circuit along the X axis in order to provide for even distribution of the outside air and most efficient utilization of the outside air cooling circuit. The filter 48 captures particulate from both the outside air and the return air. The filter 48 is a single piece so that it can be conveniently replaced as needed. An alternate location of the outside air intake is through the bottom of the unit, as illustrated at 15'. Of course, in this embodiment the damper would be moved accordingly.

A stale air exhaust is located elsewhere in the conditioned space to allow for the spilling or exhaust of air from the conditioned space at a rate substantially equal to the flow of outside air into the conditioned space. This is accomplished by the normal cracks and crevices in the conditioned space, by operating an exhaust fan, by a slightly opened window or by some other suitable air exit.

A thermostat 94 preferably located remote from the unit control 58 monitors; temperature within the room. A user selects a temperature in accordance with his or her personal preference. When the temperature within the conditioned area exceeds the preselected temperature, a signal is sent from the thermostat 94 to the unit control 58 which in turn actuates the chilled water valve to an open position to allow circulation of coolant through the return air cooling circuit 30. Once the select temperature is again achieved, the solenoid operated temperature control valve 80 is closed to halt circulation of coolant through the return air circuit 30 of the coil 26. If the temperature drops a predetermined amount below the selected temperature, a signal is sent by the thermostat which causes the unit control to actuate the electric heater 57 so as to heat the air being delivered to the conditioned space. Thus, in this manner, temperature is maintained within a selected range within the conditioned space while humidity is constantly maintained at a desired level.

The HVAC unit of the present invention allows for introduction of outside air only when a conditioned space is occupied, to minimize energy consumption. It further provides dehumidification of outside air introduced into a conditioned space as required, thereby preventing an unwanted buildup of humidity which not only promotes microbial growth within the space, but leads to occupant discomfort. By employing a single fan coil divided into an outside air cooling portion and a return air cooling portion, equipment and assembly costs are minimized. Dividing the coil into its respective circuit also allows for optimization of the use of coolant, thereby enhancing unit efficiency. Controlling the circulation of outside air based upon occupancy minimizes the need for dehumidification of outside air, minimizing energy consumption. Efficiency is further improved by monitoring the need to dehumidify outside air and dehumidifying the outside air only when necessary.

What is claimed is:

1. A heating, ventilation and air conditioning (HVAC) unit for a conditioned space comprising:

a cooling coil divided into a first cooling coil circuit and a second cooling coil circuit each in fluid communication with coolant from a coolant supply, each of the first and second cooling coil circuits having a leading and trailing surface, the leading surfaces being defined by first and second perpendicular axes with the coil being divided along the first axis into the first and second circuits;

an outside air intake introducing air from outside to inside the conditioned space, the outside air intake being positioned to distribute outside air to substantially the center of the leading surface of the first cooling coil circuit along the second axis;

a return air intake for introducing return air from inside the conditioned space to the leading surface of the second circuit of the coil;

a first valve in fluid communication with the coolant supply and the first cooling coil circuit, the first valve having an open setting permitting and a closed setting preventing the circulation of coolant through the first cooling coil circuit;

humidity control means coupled to the first valve for actuating the first valve between the open and closed settings as a function of a need to decrease the humidity of the outside air introduced into the conditioned space; and an exhaust introducing dehumidified outside and return air to the conditioned space.

2. The HVAC unit of claim 1 further comprising:

a second valve in fluid communication with the coolant supply of the second cooling coil circuit, the second valve selectively permitting and preventing the circulation of coolant through the second cooling coil circuit; and temperature control means coupled to the second valve for actuating the second valve between the open and closed settings as a function of a need to decrease the temperature of the conditioned space.

3. The HVAC unit of claim 1 further comprising a fan in fluid communication with the exhaust for drawing outside air into the outside air intake and return air into the return air intake.

4. The HVAC unit of claim 1 further comprising a heater in fluid communication with the exhaust for heating the outside and return air before introduction to the conditioned space.

5. The HVAC system of claim 3 further comprising a damper in fluid communication with the outside air intake having an open position enabling outside air to flow through the outside air intake and a closed position preventing outside air from flowing through the outside air intake, and an activation switch located remote from the unit coupled with the damper, the activation switch having a first setting causing the damper to be open and second setting causing the damper to be closed.

6. The HVAC system of claim 3 further comprising a damper in fluid communication with the outside air intake having an open position enabling outside air to flow through the outside air intake and a closed position preventing outside air from flowing through the outside air intake, and an occupancy sensor within the conditioned space for sensing the presence or absence of a human within the conditioned space coupled to the damper, the occupancy sensor when sensing the presence of a human within the conditioned space causing the damper to be open and when sensing the absence of a human within the conditioned space causing the damper to be closed.

7. A method of conditioning the air within a conditioned space comprising:

a) providing an outside air cooling coil circuit and a return air cooling coil circuit;

b) monitoring the conditioned space for the presence or absence of a human;

c) when a human is present, continuously directing outside air onto the outside air cooling coil circuit and into the conditioned space;

d) continuously monitoring the need to decrease the humidity of the outside air directed onto the outside air cooling coil circuit to maintain the humidity within the conditioned space below a select humidity threshold; and e) circulating coolant through the outside air cooling coil circuit when 1) a human present in the conditioned space and 2) the humidity within the conditioned space is determined to be above the select humidity threshold.

8. The method of claim 7 further comprising when a human is present, continuously spilling air from the conditioned space to outside the conditioned space.

9. The method of claim 7 firther comprising when a human is present, continuously directing air from inside the conditioned space over the return air cooling coil circuit and back into the conditioned space.

10. The method of claim 9 further comprising:

mixing the outside air from over the outside air cooling coil circuit and return air from over the return air cooling coil circuit; and introducing the mixed air into the conditioned space.

11. The method of claim 9 further comprising:

continuously monitoring the temperature inside the conditioned space; and circulating coolant through the return air cooling coil circuit only when the temperature inside the conditioned space exceeds a select temperature.

12. The method of claim 7 wherein step b) is performed by providing an occupancy sensor in the conditioned space.

13. The method of claim 12 wherein steps c) and e) are performed by electrically coupling the occupancy sensor to a damper in fluid communication with the outside air and a means for circulating coolant through the outside air cooling coil circuit.

14. A heating, ventilation and air conditioning (HVAC) unit for a conditioned space comprising:

an outside air cooling coil circuit in fluid communication with coolant from a coolant supply, the outside air cooling coil circuit having a leading and a trailing surface;

an outside air intake introducing air from outside to inside the conditioned space, the outside air intake being positioned to distribute outside air to the leading surface of the outside air cooling coil circuit;

a damper in fluid communication with the outside air intake having an open position permitting and a closed position preventing outside air to enter the outside air intake;

a valve in fluid communication with the coolant supply and outside air cooling coil circuit, the valve having an open setting permitting and a closed setting preventing the circulation of coolant through the outside air cooling coil circuit;

an exhaust introducing the outside air from the trailing surface of the outside air cooling coil circuit to the conditioned space;

an HVAC unit control operatively associated with the valve and the damper for controlling their operation; and an occupancy control means for generating a signal indicating the presence of a human within the conditioned space operatively associated with the HVAC until control, the HVAC unit control, in response to a signal from the occupancy control indicating the presence of a human within the conditioned space, causing the damper to be in the open position and enabling the valve to be switched between the closed and open settings.

15. The HVAC unit of claim 14 further comprising humidity control means coupled to the HVAC unit control for generating a signal indicating the need to decrease humidity within the conditioned space, the HVAC control in response to the signal actuating the valve to the open setting.

16. The HVAC unit of claim 14 wherein when the occupancy control does not generate a signal indicating the presence of a human within the conditioned space, the HVAC unit control actuates the damper to its closed position and actuates the valve to the closed setting.

* * * * *